United States Patent [19]

Circosta

[11] Patent Number: 5,531,515
[45] Date of Patent: Jul. 2, 1996

[54] AUXILIARY BRAKE SYSTEM FOR FOUR-WHEEL-DRIVE VEHICLE

[76] Inventor: Vincent Circosta, 47989 Cochran Hill Rd., Clarington, Ohio 43915

[21] Appl. No.: 437,470

[22] Filed: May 8, 1995

[51] Int. Cl.[6] .................................................. B60K 23/08
[52] U.S. Cl. .......................... 303/143; 180/244; 303/149
[58] Field of Search ............................ 180/244; 303/143, 303/146, 149, 169, 113.1, 113.2, DIG. 6

[56] References Cited

U.S. PATENT DOCUMENTS

| | | | |
|---|---|---|---|
| 4,878,559 | 11/1989 | Moon et al. | 180/244 |
| 5,058,018 | 10/1991 | Kuwana et al. | 303/149 |
| 5,083,631 | 1/1992 | Nakayama et al. | 303/143 |
| 5,089,967 | 2/1992 | Hasada et al. | 364/426.02 |
| 5,171,071 | 12/1992 | Takata et al. | 303/113.2 |
| 5,234,264 | 8/1993 | Willmann et al. | 303/113.2 |
| 5,241,479 | 8/1993 | Matusda et al. | 364/426.03 |
| 5,275,477 | 1/1994 | Schaefer et al. | 303/113.2 |

FOREIGN PATENT DOCUMENTS 2273540  6/1994  United Kingdom .................. 180/244

*Primary Examiner*—Matthew C. Graham
*Attorney, Agent, or Firm*—Kevin A. Sembrat

[57] ABSTRACT

An auxiliary brake system for a four-wheel-drive vehicle is disclosed whose main components of the present invention are four solenoid valves. These valves are located under the body of the vehicle, and are affixed in communication with the existing vehicle hydraulic brake system. Electrical wiring unites this system to two corresponding control buttons located within access to the driver. One control button functions to block the pressure for the left side of the vehicle; the other control button functions to block the pressure for the right side of the vehicle. The valves that control the front wheels of the vehicle may be mounted on the master cylinder, while the valves for the rear wheels may be in one body which would replace a 'tee' fitting on the rear axle.

4 Claims, 2 Drawing Sheets

AUXILIARY BRAKE SYSTEM FOR FOUR-WHEEL-DRIVE VEHICLE

BACKGROUND OF THE INVENTION

1. Field of the Invention

The present invention relates generally to a brake system and, more particularly, to an auxiliary brake system which operates in conjunction with a vehicle's hydraulic brake system to allow a driver independently to control the wheels on the left or right side of the vehicle.

2. Description of the Related Art

In the related art, many auxiliary braking and brake related steering systems are known. Most of these address problems in conjunction with anti-skid, or anti-lock braking systems. These systems address the problems associated with traction control of a vehicle on pavement.

However, a different set of problems occurs from the use of a four-wheel-drive vehicle, especially in "off-road" or under slick conditions. Under such conditions, a driver of a four-wheel-drive vehicle may encounter a situation where the vehicle may become stranded due to the wheels on one side of the vehicle lose traction and begin to spin. This can occur when crossing a muddy or snow covered hill, for example. Under such situations, typical anti-lock braking systems are ineffective. In these situations, the ability to brake the wheels on only one side of the vehicle will greatly improve the maneuverability and control of a four-wheel-drive vehicle.

Numerous attempts have been made to improve braking systems and improve traction, stopping, and steering problems. For instance, U.S. Pat. No. 5,275,477 issued in the name of Schaefer et al., discloses a hydraulic dual-circuit brake system. However, a hydraulic dual-circuit brake system made in accordance with this reference merely distributes braking pressure between front axle and rear axle, and does not address the problems associated with the use of four-wheel-drive vehicles in off-road applications.

Also, in U.S. Pat. No. 5,234,264 issued in the name of Willmann et al., a brake system is disclosed which distributes braking pressure between all four wheels. Such an anti-skid device, however, would not assist the user of a four-wheel-drive vehicle in off-road applications, in that the spinning of the wheels during such activity would merely cause the braking pressure to be evenly distributed as in a regular, non-antiskid system.

Additionally, U.S. Pat. No. 5,171,071 issued in the name of Takata et al. discloses a brake system to improve brake pedal travel and response during anti-lock and traction control. Also, in U.S. Pat. No. 5,089,967 issued in the name of Haseda et al., an auxiliary steering system associated with anti-skid control system for use in motor vehicle is disclosed. In both of these reference the brake systems disclosed indicate improvements in the feedback dampening and distribution of braking pressure in anti-lock braking systems, but again do not address the problems associated with the use of four-wheel-drive vehicles in off-road applications.

Finally, in U.S. Pat. No. 5,241,479 issued in the name of Matusda et al., a switchable mode traction control method for vehicle is disclosed. However, the method disclosed in the Matusda et al. reference merely shifts braking force to the left or right drive wheel in a conventional two-wheel-drive vehicle if slippage is detected, and once again does not address the problems associated with the use of four-wheel-drive vehicles in off-road applications.

A need has therefore been felt for an improved but less complex mechanism that operates in conjunction with a vehicle's hydraulic brake system to allow a driver independently to control the wheels on the left or right side of a four-wheel-drive vehicle during periods where the vehicle becomes stranded in mud, snow, or other conditions where low-speed traction difficulties occur.

SUMMARY OF THE INVENTION

It is therefore an object of the present invention to provide an improved auxiliary braking system for use with four-wheel-drive vehicles.

It is another object of the present invention to provide an auxiliary braking system which is designed for four-wheel-drive vehicles and operates in conjunction with the vehicle's hydraulic brake system.

It is a further object of the present invention to provide an auxiliary braking system for use with four-wheel-drive vehicles which is activated by buttons located in the vehicle driving compartment.

It is a further object of the present invention to provide an auxiliary braking system for use with four-wheel-drive vehicles which splits the braking pressure side-to-side, as opposed to front-to-back, It is a further object of the present invention to provide an auxiliary braking system for use with four-wheel-drive vehicles which enables the driver, by pushing a button and applying pressure to the brake pedal, to control the side of the vehicle that receives braking.

It is a further object of the present invention to provide an auxiliary braking system for use with four-wheel-drive vehicles which can be installed in new or existing vehicles which utilize hydraulic braking.

Briefly described according to one embodiment of the present invention, the main components of the present invention are four solenoid valves. These valves are located under the body of the vehicle, and are affixed in communication with the existing vehicle hydraulic brake system. Electrical wiring unites this system to two corresponding control buttons located within access to the driver within the driver's compartment of the vehicle. One control button functions to block the pressure for the left side of the vehicle; the other control button functions to block the pressure for the right side of the vehicle. The valves that control the front wheels of the vehicle may be mounted on the master cylinder, while the valves for the rear wheels may be in one body which would replace a 'tee' fitting on the rear axle.

An advantage of the present invention is that when not in use the system does not alter the normal operation of the vehicle brakes.

Another advantage of the present invention is that the system enhances the traction and control of a four-wheel-drive vehicle in low-speed, off road situations.

Another advantage of the present invention is that it can be manually controlled by the vehicle driver.

Another advantage of the present invention is that it can be installed in existing four-wheel-drive vehicles.

Another advantage of the present invention is that is allows for braking to be split on a left side/right side basis.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
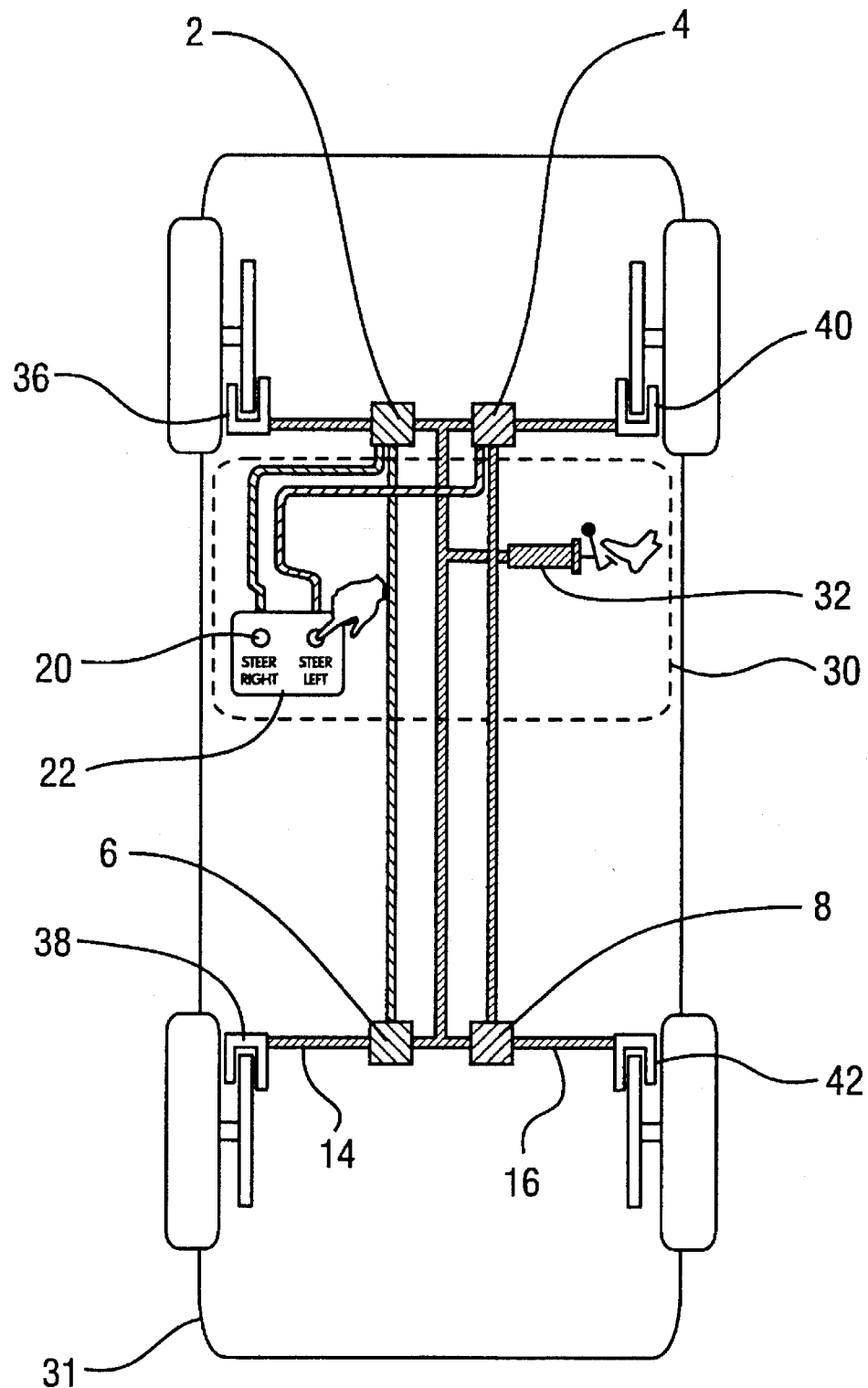
FIG. 1 is an overview schematic of an auxiliary braking system according to the present invention.

Referring now to FIG. 1, an auxiliary braking system is shown, according to the preferred embodiment of the present invention, including a left front solenoid valve 2, a right front solenoid valve 4, a left rear solenoid valve 6, and a right rear solenoid valve 8. The left front solenoid valve 2 is in fluid communication with the left front hydraulic brake line 10. The right front solenoid valve 4 is in fluid communication with the right front hydraulic brake line 12. The left rear solenoid valve 6 is in fluid communication with the left rear hydraulic brake line 14. The right rear solenoid valve 8 is in fluid communication with the right rear hydraulic brake line 16. In its preferred embodiment it is contemplated that these solenoids are to be 12 volt, normally opened, two way solenoid valves of a size and material to be compatible with standard hydraulic braking systems that are currently readily available and in wide use.

According to the preferred embodiment of the present invention, a steer right control button 20 and a steer left control button 22 are located within the driver's compartment 30 of a four-wheel-drive vehicle 31. The steer right control button 20 is in electronic communication with the left front solenoid valve 2 and the left rear solenoid valve 6. Engagement of the steer right control button 20 thereby actuates the left front solenoid valve 2 and left rear solenoid valve 6. The steer left control button 22 is in electronic communication with the right front solenoid valve 4 and the right rear solenoid valve 8. Engagement of the steer left control button 22 thereby actuates the right front solenoid valve 4 and right rear solenoid valve 8. In the normal, de-energized state of the present invention, pressure applied to the brake pedal 32 will pass through a master cylinder 50 and be transmitted to: the left front brake 36 by the left front hydraulic brake line 10; the right front brake 40 by the right front hydraulic brake line 12; the left rear brake 38 by the left rear hydraulic brake line 14; and, the right rear brake 42 by the right rear hydraulic brake line 16.

Figure 2:
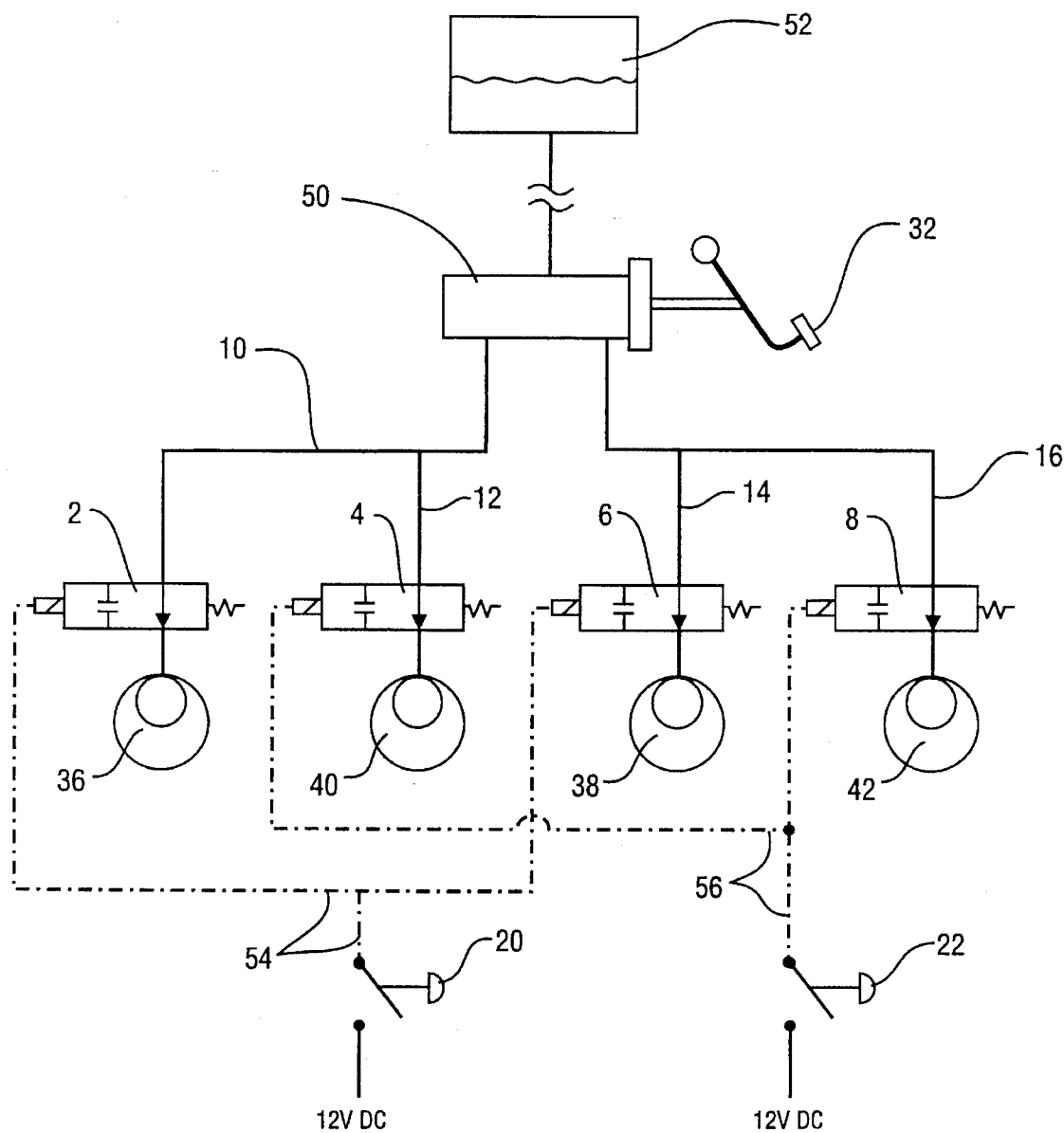
FIG. 2 is a functional schematic of the auxiliary braking system according the present invention as depicted in FIG. 1.

Referring to FIG. 2, a functional schematic of the auxiliary braking system is shown according the present invention, as depicted in FIG. 1. Brake pressure exerted upon the brake pedal 32 is transmitted to the master brake cylinder 50. It is envisioned that in its preferred embodiment the present invention will be capable of being added to an existing hydraulic brake system. Therefore, it is envisioned that supply and return of hydraulic fluid is via currently available conventional means, depicted as fluid supply means 52. From the master brake cylinder 50, the brake pressure is thereby transmitted to: the left front brake 36 by the left front hydraulic brake line 10; the right front brake 40 by the right front hydraulic brake line 12; the left rear brake 38 by the left rear hydraulic brake line 14; and, the right rear brake 42 by the right rear hydraulic brake line 16. Upon engagement by the driver, the steer left control button 22 may be depressed, thereby transmitting to second signalling means 56 to actuate the right front solenoid valve 4 and right rear solenoid valve 8. When engaged, these valves will break the communication between the master cylinder 50 and the appropriate brakes. Similarly, upon engagement by the driver the steer right control button 20 may be depressed, thereby transmitting to first signalling means 54 to actuate the left front solenoid valve 2 and left rear solenoid valve 6. When engaged, these valves also will break the communication between the master cylinder 50 and the appropriate brakes, the operation of which will be further described below.

2. Operation of the Preferred Embodiment

In operation, the present invention modifies the brake system of a four-wheel-drive vehicle to let the driver brake one side or the other of the vehicle. Power is applied to the solenoids by pushing a control button. With no power applied, the brake system operates normally. Referring to FIG. 1, when the driver wants to steer to the right, the steer right control button 20 is pressed, which actuates the left front solenoid valve 2 and leftright rear solenoid valve 6. When pressure is applied to the brake pedal 32, pressure is applied to the right front brake 40 and right rear brake 42. Since the right brakes only receive brake pressure, the left wheels will turn faster and transmit power, thereby causing the vehicle to steer right. When the driver wants to steer to the left, the steer left control button 22 is pressed, which actuates the right front solenoid valve 4 and right rear solenoid valve 8. When pressure is applied to the brake pedal 32, pressure is applied to the left front brake 36 and left rear brake 38. Since the left brakes only receive brake pressure, the right wheels will turn faster and transmit power, thereby causing the vehicle to steer left.

A typical application of the present invention occurs when a four-wheel-drive vehicle becomes stranded because the wheels on one side have very little traction. After determining which side is the problem, the present invention can be used to steer toward that side as described above. By holding the appropriate button and gently apply pressure to the brake pedal, power is transferred to the side with more traction, thereby helping to free the vehicle. Also, during extremely poor traction conditions the front wheels of a four-wheel-drive vehicle may not have enough traction to steer the vehicle. When this happens, the present invention can be used to help steer the vehicle in the desired direction.

The foregoing description is included to illustrate the operation of the preferred embodiment and is not meant to limit the scope of the invention. From the foregoing description, many variations will be apparent to those skilled in the art that would yet be encompassed by the spirit and scope of the invention. The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. An auxiliary brake system for a four-wheel-drive vehicle which operates in conjunction with the vehicle's hydraulic brake system, comprising:

an electrically actuated, normally open, spring return solenoid valve in fluid communication with the left front brake line of said vehicle's braking system;

an electrically actuated, normally open, spring return solenoid valve in fluid communication with the right front brake line of said vehicle's braking system;

an electrically actuated, normally open, spring return solenoid valve in fluid communication with the left rear brake line of said vehicle's braking system;

an electrically actuated, normally open, spring return solenoid valve in fluid communication with the right rear brake line of said vehicle's braking system; and engaging means for selectively controlling a plurality of combinations of said solenoids, wherein said engaging means comprises:

a contact closure push-button in electrical communication and control with the electrically actuated, normally open, spring return solenoid in fluid communication with the left front brake line of said vehicle's braking system;

a contact closure push-button in electrical communication and control with the electrically actuated, normally open, spring return solenoid valve in fluid communication with the right front brake line of said vehicle's braking system;

a contact closure push-button in electrical communication and control with the electrically actuated, normally open, spring return solenoid valve in fluid communication with the left rear brake line of said vehicle's braking system; and a contact closure push-button in electrical communication and control with the electrically actuated, normally open, spring return solenoid valve in fluid communication with the right rear brake line of said vehicle's braking system.

2. An auxiliary brake system for a four-wheel-drive vehicle which operates in conjunction with the vehicle's hydraulic brake system, comprising:

an electrically actuated, normally open spring return solenoid valve in fluid communication with the left front brake line of said vehicle's braking system;

an electrically actuated, normally open, spring return solenoid valve in fluid communication with the right front brake line of said vehicle's braking system;

an electrically actuated, normally open, spring return solenoid valve in fluid communication with the left rear brake line of said vehicle's braking system;

an electrically actuated, normally open, spring return solenoid valve in fluid communication with the right rear brake line of said vehicle's braking system; and engaging means for selectively controlling a plurality of combinations of said solenoids, wherein said engagement means comprises:

a contact closure push-button in electrical communication and control with both the electrically actuated, normally open, spring return solenoid valve in fluid communication with the left front brake line of said vehicle's braking system and the electrically actuated, normally open, spring return solenoid valve in fluid communication with the left rear brake line of said vehicles braking system, such that engagement of said contact closure push-button simultaneously actuates both said solenoid valves; and a contact closure push-button in electrical communication and control with both the electrically actuated, normally open, spring return solenoid valve in fluid communication with the right front brake line of said vehicle's braking system and the electrically actuated, normally open, spring return solenoid valve in fluid communication with the right rear brake line of said vehicle's braking system such that engagement of said contact closure push-button simultaneously actuates both said solenoid valves.

3. An auxiliary brake system for a four-wheel-drive vehicle which operates in conjunction with the vehicle's hydraulic brake system, comprising;

a hydraulic braking system and individually actuated brakes located on each wheel;

first switching means for controllably simultaneously isolating brake pressure from the braking mechanism at the wheels on the left side of said vehicle;

second switching means for controllably simultaneously isolating brake pressure from the braking mechanism at the wheels on the right side of said vehicle;

first and second actuation means for actuating said first and second switching means, respectively; and first and second engaging means for selectively controlling a plurality of combinations of said actuation means, wherein said first and second engagement means comprises a plurality of contact closure push buttons located within the driver's compartment of said vehicle.

4. An auxiliary brake system for a four-wheel-drive vehicle which operates in conjunction with the vehicle's hydraulic brake system, comprising;

plurality of brake pressure switching means for controllably isolating brake pressure from the braking mechanism at a plurality of wheels of a vehicle;

actuation means for actuating said pressure switching means; and engaging means for selectively controlling a plurality of combinations of said brake pressure switching means by engaging a plurality of said actuation means, wherein said engagement means comprises a plurality of contact closure push buttons located within the driver's compartment of said vehicle.

* * * * *